(12) United States Patent
Ito

(10) Patent No.: US 8,601,033 B2
(45) Date of Patent: Dec. 3, 2013

(54) INFORMATION TERMINAL, AUTHENTICATION CONDITION CHECK METHOD THEREOF, AND AUTHENTICATION CONDITION CHECK PROGRAM

(75) Inventor: Goro Ito, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1410 days.

(21) Appl. No.: 11/284,587

(22) Filed: Nov. 22, 2005

(65) Prior Publication Data
US 2006/0126112 A1  Jun. 15, 2006

(30) Foreign Application Priority Data
Nov. 26, 2004 (JP) .............................. P.2004-341871

(51) Int. Cl.
*G06F 17/30* (2006.01)
(52) U.S. Cl.
USPC ........... 707/805; 707/791; 707/802; 707/803; 707/804; 707/806; 707/807; 707/808; 707/809; 707/812; 709/206; 709/207
(58) Field of Classification Search
USPC .......... 707/102, 791, 802–809, 812, 999.102; 709/206, 207
See application file for complete search history.

(56) References Cited

U.S. PATENT DOCUMENTS

| | | | |
|---|---|---|---|
| 7,013,478 B1 * | 3/2006 | Hendricks et al. ............... | 725/46 |
| 7,158,986 B1 * | 1/2007 | Oliver et al. ................... | 707/102 |
| 7,296,222 B1 | 11/2007 | Sakairi | |
| 2002/0056058 A1 * | 5/2002 | Nishio et al. .................... | 714/42 |
| 2002/0065802 A1 * | 5/2002 | Uchiyama ......................... | 707/1 |
| 2002/0116291 A1 * | 8/2002 | Grasso et al. .................. | 705/27 |
| 2002/0116703 A1 | 8/2002 | Terasaki | |
| 2003/0028889 A1 * | 2/2003 | McCoskey et al. ............. | 725/91 |
| 2003/0055831 A1 * | 3/2003 | Ryan et al. ..................... | 707/100 |
| 2003/0071837 A1 * | 4/2003 | Sorensen et al. .............. | 345/705 |
| 2003/0088562 A1 * | 5/2003 | Dillon et al. ...................... | 707/5 |
| 2003/0195937 A1 * | 10/2003 | Kircher et al. ................. | 709/207 |
| 2005/0021404 A1 * | 1/2005 | Schoder et al. ................. | 705/14 |

(Continued)

FOREIGN PATENT DOCUMENTS

| | | | |
|---|---|---|---|
| JP | 08339382 A | 12/1996 | |
| JP | 2000305835 A | 11/2000 | |

(Continued)

OTHER PUBLICATIONS

Fuyuhiko Ikeda, "Norton Internet Security, Internet Security Barrier, Net Defense Forces, MAC Power" ASCII Inc., vol. 12, No. 9, pp. 152-157, Sep. 1, 2001.

(Continued)

*Primary Examiner* — Syling Yen
(74) *Attorney, Agent, or Firm* — DLA Piper LLP (US)

(57) ABSTRACT

An information terminal which has a storage section which stores a guide and a specific character string, and a control section. The guide indicates a possibility that an acquisition act of a different electronic document associated with an electronic document displayed on a display section is permitted only if an authentication condition stipulated at the site having the different electronic document is met The control section searches the electronic document displayed on the display section for the specific character string, and counts character strings matching the specific character string when a condition check operation is performed through the operation section. The control section further controls the display section to display the guide if an acquired count is equal to or greater than a predetermined number.

23 Claims, 10 Drawing Sheets

(56) References Cited

U.S. PATENT DOCUMENTS

| | | | |
|---|---|---|---|
| 2005/0262428 A1* | 11/2005 | Little et al. | 715/501.1 |
| 2007/0043817 A1* | 2/2007 | Oliver et al. | 709/206 |
| 2009/0089272 A1* | 4/2009 | Oliver et al. | 707/5 |

FOREIGN PATENT DOCUMENTS

| | | |
|---|---|---|
| JP | 2002-169644 | 6/2002 |
| JP | 2002366491 A | 12/2002 |
| JP | 2003030138 A | 1/2003 |
| JP | 2004213153 A | 7/2004 |

OTHER PUBLICATIONS

Japanese language office action dated Mar. 23, 2010 and its English language translation for corresponding Japanese application 2004341871.

* cited by examiner

FIG. 8

SERVICE USE CONVENTION
1. CONFIRMATION
TO USE THE XX SERVICE (WHICH WILL BE HEREINAFTER REFERRED TO AS THE SERVICE) PROVIDED BY ** CO. LTD., (WHICH WILL BE HEREINAFTER REFERRED TO AS THE COMPANY), THE USE SHALL CONSENT TO THE FOLLOWING AND USE THE SERVICE FOLLOWING THE SERVICE USE CONVENTION (WHICH WILL BE HEREINAFTER REFERRED TO AS THE CONVENTION):
2. REGISTRATION
TO USE THE SERVICE, REGISTRATION IS REQUIRED. REGISTRATION OF THE SERVICE CAN BE MADE FREE OF CHARGE. THE REGISTRATION STATE WILL BE MAINTAINED AND UPDATED AT NO COSTS.

·
·
·

15. TO USE THE SERVICE, THE USE START OF EACH SERVICE SEPARATELY DEFINED AS WELL AS THE REGISTRATION IS REQUIRED.
16. USAGE CHARGE
(A) FOR THE USAGE CHARGE, THE USER IS OBLIGATED TO PAY THE FIXED-PRICE USAGE CHARGE OF CONTENT BY WAY OF COMPENSATION FOR RECEIVING THE SERVICE.
(B) THE COMPANY WILL DEMAND THE USAGE CHARGE OF THE USER WITH THE END OF THE MONTH AS THE CLOSING DATE. THE COMPANY WILL NOT ISSUE A BILL OR A RECEIPT.
(C) THE USER SHALL ALWAYS BE OBLIGATED TO PAY THE USAGE CHARGE DURING THE AGREEMENT TIME PERIOD EVEN IF USE OF THE SERVICE STOPS OR BECOMES IMPOSSIBLE.

```
SERVICE USE CONVENTION
1. CONFIRMATION
TO USE THE XX SERVICE (WHICH WILL BE
HEREINAFTER REFERRED TO AS THE SERVICE)
PROVIDED BY ** CO. LTD., (WHICH WILL BE
HEREINAFTER REFERRED TO AS THE COMPANY),
THE USE SHALL CONSENT TO THE FOLLOWING AND
USE THE SERVICE FOLLOWING THE SERVICE USE
CONVENTION (WHICH WILL BE HEREINAFTER
REFERRED TO AS THE CONVENTION):
2. REGISTRATION
TO USE THE SERVICE, REGISTRATION IS REQUIRED.
REGISTRATION OF THE SERVICE CAN BE MADE
FREE OF CHARGE. THE REGISTRATION STATE WILL
BE MAINTAINED AND UPDATED AT NO [COSTS].
                     ·
                     ·
                     ·
15. TO USE THE SERVICE, THE USE START OF EACH
SERVICE SEPARATELY DEFINED AS WELL AS THE
REGISTRATION IS REQUIRED.
16. [USAGE CHARGE]
(A) FOR THE USAGE [CHARGE], THE USER IS
[OBLIGATED] TO [PAY] THE FIXED-[PRICE] [USAGE]
[CHARGE] OF CONTENT BY WAY OF COMPENSATION
FOR RECEIVING THE SERVICE.
(B) THE COMPANY WILL [DEMAND] THE [USAGE]
[CHARGE] OF THE USER WITH THE END OF THE
MONTH AS THE CLOSING DATE. THE COMPANY
WILL NOT ISSUE A [BILL] OR A RECEIPT.
(C) THE USER SHALL ALWAYS BE [OBLIGATED] TO
[PAY] THE USAGE [CHARGE] DURING THE AGREEMENT
TIME PERIOD EVEN IF USE OF THE SERVICE STOPS
OR BECOMES IMPOSSIBLE.
                     ·
                     ·
                     ·
```

INFORMATION TERMINAL, AUTHENTICATION CONDITION CHECK METHOD THEREOF, AND AUTHENTICATION CONDITION CHECK PROGRAM

CROSS-REFERENCE TO RELATED APPLICATIONS

This application is based upon and claims the benefit of priority from the prior Japanese Patent Applications No. 2004-341817, filed on Nov. 26, 2004, the entire contents of which are incorporated herein by reference.

BACKGROUND OF THE INVENTION

1. Field of the Invention

This invention relates to an information terminal which communicates with a site on a communication network to acquire an electronic document such as a Web page that the site has, and an authentication condition check method of the information terminal and an authentication condition check program executed in the information terminal.

2. Description of the Related Art

An information terminal which acquires an electronic document such as a Web page through a communication network is available. (For example, refer to JP-A-2002-169644.)

The electronic document refers to a collection of information that can be browsed at a time on a browser (browsing software) such as a Web browser, and is formed so as to contain text and/or image information. The electronic document can be formed so as to contain voice information, moving image information, etc., in addition to the text and/or image information.

Such an electronic document is provided from a site on a communication network such as a Web site, and can be acquired with an information terminal through the communication network as explained in JP-A-2002-169644 and can also be stored in a storage section of the information terminal.

The site refers to a data group collectively made up of electronic documents such as a large number of Web pages administrated by one or more servers connected to a network constructed on the communication network or the address of the data group of the server.

When an electronic document as mentioned above is displayed on a display section of an information terminal, if the user specifies a specific portion of the text, different text, a different electronic document, etc., associated with the specific portion is read from the storage section of the information terminal or is acquired from a different site through the communication network for displaying the different text, the different electronic document, etc., on the display section; this function is called hyper link function.

The sites on the communication network for providing such electronic documents include a free site for providing electronic documents free of charge and a charged site for providing all or some electronic documents with a charge. To acquire a pay electronic document from the charged site, the user needs to make a contract with the manager, etc., of the charged site.

To make such a contract, for example, the user needs only to acquire an electronic document describing the contract sign-up form using the hyper link function and then enter the user ID given by the management carrier of the communication line to which the information terminal of the user connects, the number of the credit card of the user, or the like in a predetermined column of the sign-up form and transmit the form to the manager, etc., of the charged site.

The charging system of the charged site is determined uniquely for each charged site; for example, there are a charging system wherein the user can acquire electronic documents at the charged site free of charge after paying charge at the user registration time, a charging system wherein the user must pay charge each time the user acquires an electronic document at the charged site still after user registration, and the like. Thus, the user needs to read and check the convention, etc., described about the charging system, etc., of the charged site before making a contract with the charged site.

The charged site provides such a convention as an electronic document like the contract sign-up form. The user can display the electronic document of the convention on the display section of the information terminal using the hyper link function.

Some sites impose other conditions than the charge payment about providing electronic documents regardless of the charged site or the free site. For example, some sites provide electronic documents provided that the user reaches a given age.

In order to acquire an electronic document from the site imposing any other condition than the charge payment, the user also needs to read and check the convention described about the condition stipulated by the site. The site imposing the condition provides such an electronic document like the convention of the charged site, and the user can display the electronic document of such a convention on the display section of the information terminal using the hyper link function.

In the specification, conditions that the user needs to conform to or approve to acquire an electronic document, such as the requirement for charge payment to acquire an electronic document provided by the site and the requirement for the user to reach a given age, and stipulated by the site as the convention, will be referred to as "authentication conditions".

JP-A-2002-169644 is referred to as a related art.

However, among the cases that a user makes a contract with the charged site, the user who does not sufficiently read the convention about the authentication conditions may be unaware that the site is a charged site and may conduct user registration with misunderstanding that the site is a free site. The user may misunderstand that a system where the user is charged each time acquiring an electronic document although user registration is free of charge is a free site, and may acquire a pay electronic document assuming that the pay electronic document is free of charge.

If it is stipulated that the user be able to acquire an electronic document from the site only if the user meets the authentication conditions of the age the user who does not sufficiently read the convention about the authentication conditions may misunderstand that it is not necessary to meet such authentication conditions to acquire an electronic document.

A malicious site makes the convention described in an electronic document unnecessarily long or difficult to understand or exaggerates a part of the description of advertisement, thereby intentionally causing the user to misunderstand the charge payment and the authentication conditions of the age. Thus, the user incurs damage.

SUMMARY OF THE INVENTION

An object of the invention is to provide an information terminal which enables to prevent a user from carelessly connecting to a site without sufficiently recognizing the fact that an authentication condition stipulated by the site having an electronic document needs to be met in order to acquire the electronic document, and an authentication condition check method of the information terminal, and an authentication condition check program executed in the information terminal.

The invention provides an information terminal, having: a communication section which communicates with any desired site to acquire an electronic document including text; a display section which displays the electronic document; an operation section for a user to operate the electronic document displayed on the display section; a storage section which stores a guide and a specific character string, wherein the guide indicates a possibility that an acquisition act of a different electronic document associated with the electronic document displayed on the display section through the communication section is permitted only if an authentication condition stipulated at the site having the different electronic document is met; and a control section which searches the electronic document displayed on the display section for the specific character string to count character strings matching the specific character string when a condition check operation is performed through the operation section, wherein the control section controls the display section to display the guide if an acquired count is equal to or greater than a predetermined number.

In the information terminal, the storage section may store a plurality of the specific character strings.

In the information terminal, point information corresponds to each of the specific character strings, and when the control section may count character strings matching any of the specific character strings, the control section may calculate the acquired count based on the number of character strings matching any of the specific character strings and the point information.

In the information terminal, at least one character constituting the specific character string enables to be changed through an operation with using the operation section, and the storage section stores a changed specific character string.

In the information terminal, the control section may perform the searching operation only if the electronic document displayed on the display section is acquired through the communication section.

In the information terminal, the storage section may store a plurality of the guides for each level of the count, and the control section may control the display section to display one of the guides according to a level of the acquired count.

In the information terminal, when the control section controls the display section to display the guide, the control section may control to display an electronic document together and may display a character string matching the specific character string in the electronic document in a different format from that of other character strings.

In the information terminal, if an operation for displaying an electronic document on the display section is performed through the operation section after the control section controls the display section to display the guide, the control section may control to display a character string matching the specific character string in the electronic document in a different format from that of other character strings.

The invention also provides an authentication condition check method of an information terminal, having: a communication section which communicates with any desired site to acquire an electronic document including text; a display section which displays the electronic document; an operation section for a user to operate the electronic document displayed on the display section; and a storage section, the authentication condition check method comprises the steps of: storing a guide and a specific character string in the storage section, wherein the guide indicates a possibility that an acquisition act of a different electronic document associated with the electronic document displayed on the display section through the communication section is permitted only if an authentication condition stipulated at the site having the different electronic document is met; searching the electronic document displayed on the display section for the specific character string to count character strings matching the specific character string when a condition check operation is performed through the operation section; and controlling the display section to display the guide if an acquired count is equal to or greater than a predetermined number.

The invention also provides an authentication condition check program for causing an information terminal to function as: a communication section which communicates with any desired site to acquire an electronic document including text; a display section which displays the electronic document; an operation section for a user to operate the electronic document displayed on the display section; a storage section which stores a guide and a specific character string, wherein the guide indicates a possibility that an acquisition act of a different electronic document associated with the electronic document displayed on the display section through the communication section is permitted only if an authentication condition stipulated at the site having the different electronic document is met; and a control section which searches the electronic document displayed on the display section for the specific character string to count character strings matching the specific character string when a condition check operation is performed through the operation section, wherein the control section controls the display section to display the guide if an acquired count is equal to or greater than a predetermined number.

In the authentication condition check program, the storage section may store a plurality of the specific character strings.

In the authentication condition check program, point information corresponds to each of the specific character strings, and when the control section may count character strings matching any of the specific character strings, the control section may calculate the acquired count based on the number of character strings matching any of the specific character strings and the point information.

In the authentication condition check program, at least one character constituting the specific character string enables to be changed through an operation with using the operation section, and the storage section stores a changed specific character string.

In the authentication condition check program, the control section may perform the searching operation only if the electronic document displayed on the display section is acquired through the communication section.

In the authentication condition check program, the storage section may store a plurality of the guides for each level of the count, and the control section may control the display section to display one of the guides according to a level of the acquired count.

In the authentication condition check program, when the control section controls the display section to display the guide, the control section may control to display an electronic document together and may display a character string matching the specific character string in the electronic document in a different format from that of other character strings.

In the authentication condition check program, if an operation for displaying an electronic document on the display section is performed through the operation section after the control section controls the display section to display the guide, the control section may control to display a character string matching the specific character string in the electronic document in a different format from that of other character strings.

According to the information terminal, the authentication condition check method, and the authentication condition check program, the user can be prevented from connecting to the site carelessly without sufficiently recognizing the fact that the authentication condition stipulated by the site having the electronic document needs to be met in order to acquire the electronic document.

BRIEF DESCRIPTION OF THE DRAWINGS

FIG. 8 is a conceptual drawing to show the electronic document 42 shown in FIG. 7;

FIG. 9 is a conceptual drawing to show the electronic document 42 shown in FIG. 7 and is a drawing to show a state in which some character strings are displayed in a different format from that of other character strings;

DETAILED DESCRIPTION OF THE PREFERRED EMBODIMENTS

Embodiments of an information terminal, an authentication condition check method of the information terminal, and an authentication condition check program according to the invention will be discussed specifically based on the accompanying drawings.

First Embodiment

FIGS. 1 to 9 are reference drawings to describe a mobile telephone 2 (corresponding to an information terminal), an authentication condition check method of the mobile telephone, and an authentication condition check program according to a first embodiment of the invention.

Figure 1:
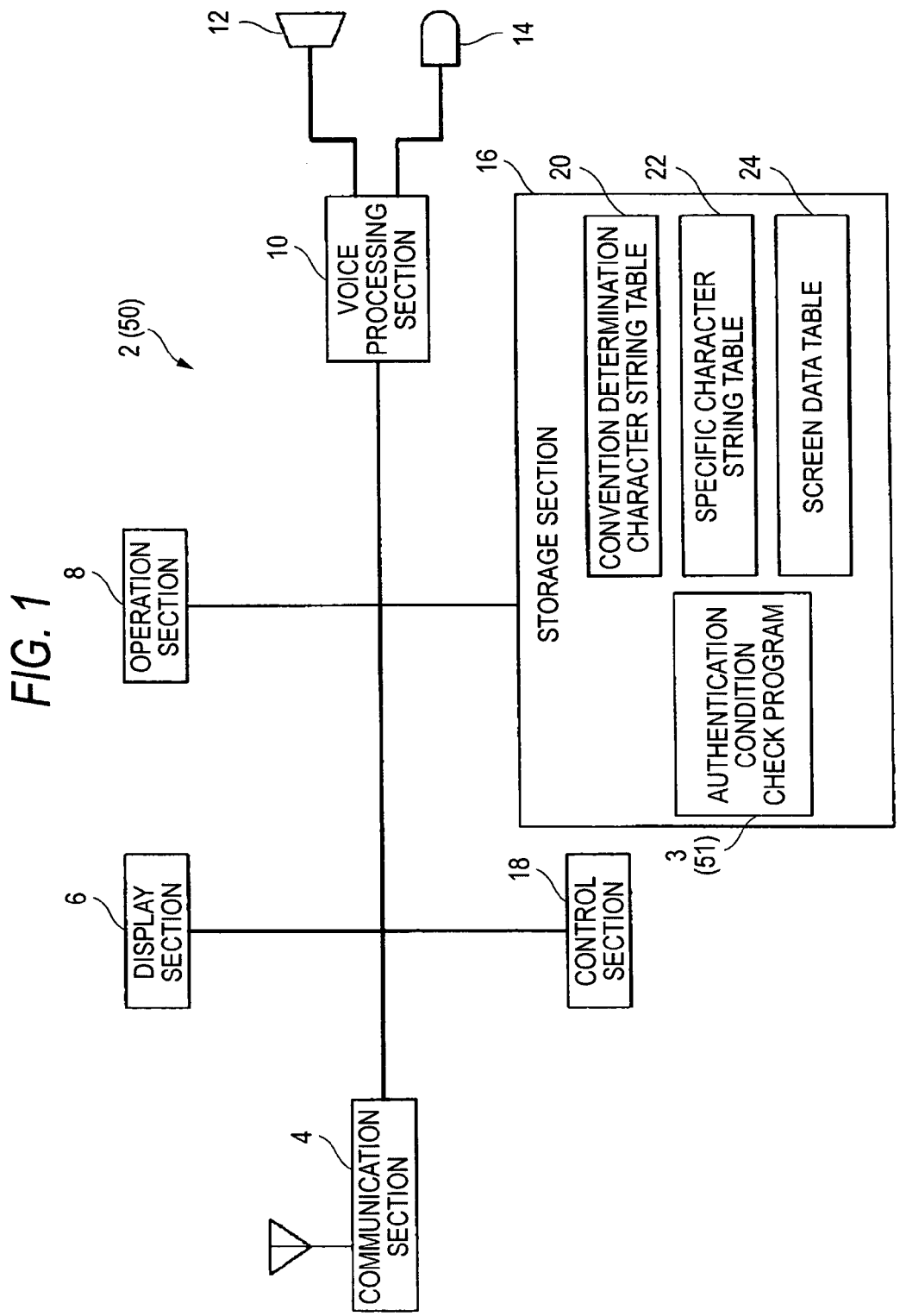
FIG. 1 is a block diagram to show the circuit configuration of each of mobile telephones 2 and 50 according to first and second embodiments of the invention.

FIG. 1 is a block diagram to show the circuit configuration of the mobile telephone 2 according to the first and second embodiments. As shown in FIG. 1, the mobile telephone 2 includes a communication section 4, a display section 6, an operation section 8, a voice processing section 10, a loudspeaker 12, a microphone 14, a storage section 16, and a control section 18 for controlling the components.

Figure 2:
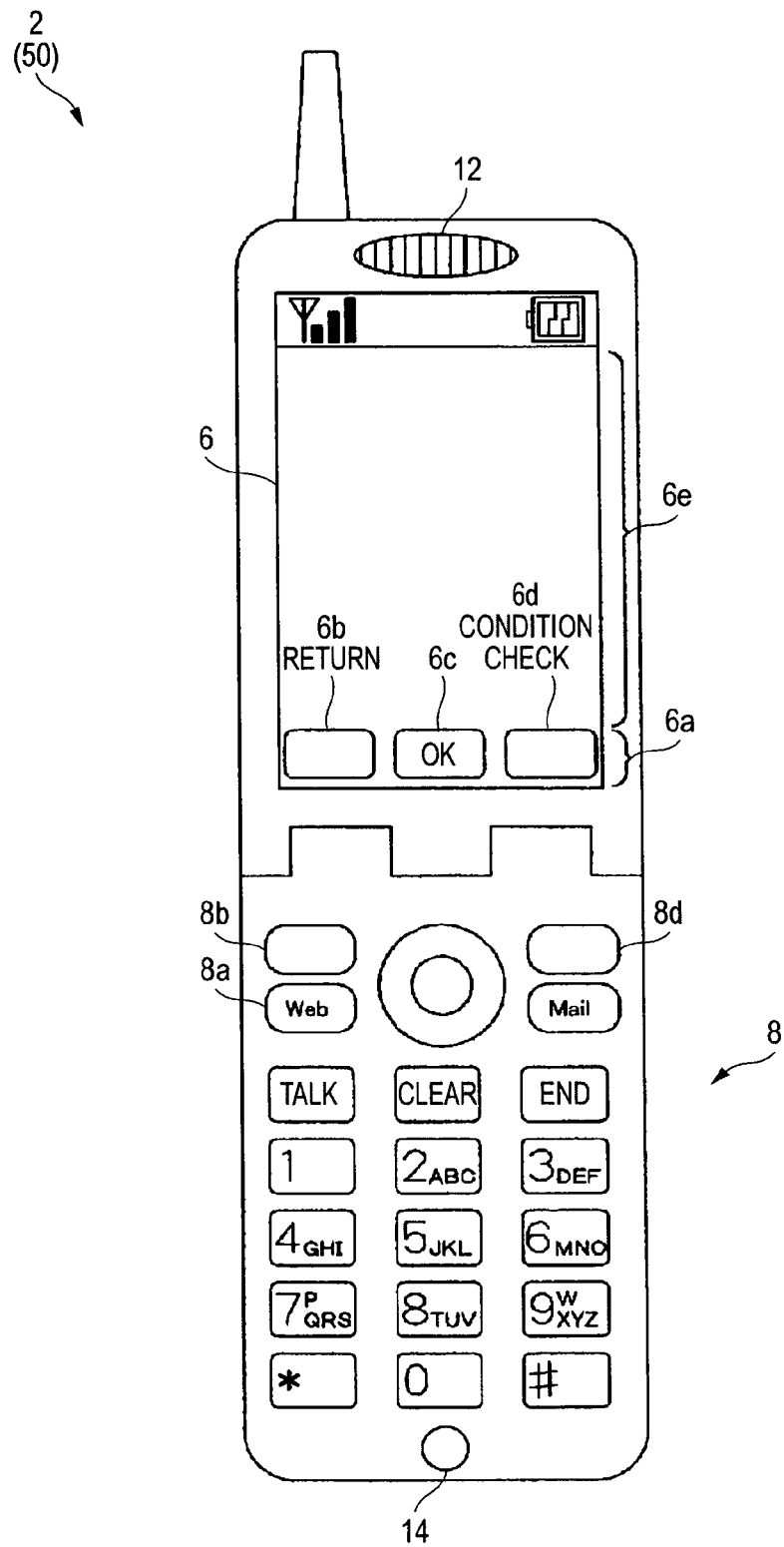
FIG. 2 is a plan view to show the mobile telephones 2 and 50 according to the first and second embodiments of the invention.

As shown in FIG. 2, the operation section 8 includes a Web key 8a and soft keys 8b, 8c, and 8d. Function guidance 6b, 6c, and 6d corresponding to the soft keys 8b, 8c, and 8d of the operation section 8 respectively are displayed in a lower portion 6a of the display screen of the display section 6 closed to the operation section 8. A screen of an electronic document is displayed in a widest mid stage portion 6e of the display section 6 above the lower portion 6a thereof.

When the user presses any of the soft key 8b, 8c, or 8d of the operation section 8, the processing operation of the control section 18 corresponding to the key operation becomes different each time the screen displayed in the mid stage portion 6e of the display section 6 is switched. Thus, the current operation descriptions of the soft keys 8b, 8c, and 8d are displayed in the function guidance 6b, 6c, and 6d of the display section 6.

For example, if the user operates the soft key 8b, the processing operation of the control section 18 corresponding to the key operation is not performed in some cases depending on the screen displayed in the mid stage portion 6e. In such a case, display of the function guidance 6b corresponding to the soft key 8b is suppressed.

Like the function guidance 6b, the function guidance 6c, 6d corresponding to the soft key 8c, 8d is not displayed if the processing operation of the control section 18 corresponding to the key operation of the soft key 8c, 8d is not performed/

Whether or not the function guidance 6b, 6c, 6d is displayed is determined under the control of the control section 18. The operation descriptions of the soft keys 8b, 8c, and 8d displayed in the function guidance 6b, 6c, and 6d are previously stored in the storage section 16 and the control section 18 determines which of the operation descriptions is to be displayed as the function guidance 6b, 6c, 6d based on the screen displayed in the mid stage portion 6e of the display section 6.

The storage section 16 shown in FIG. 1 stores an authentication condition check program 3 for causing the control section 18 to perform the processing operation described later. The storage section 16 further stores a convention determination character string table 20, a specific character string table 22, and a screen data table 24.

Figure 3:
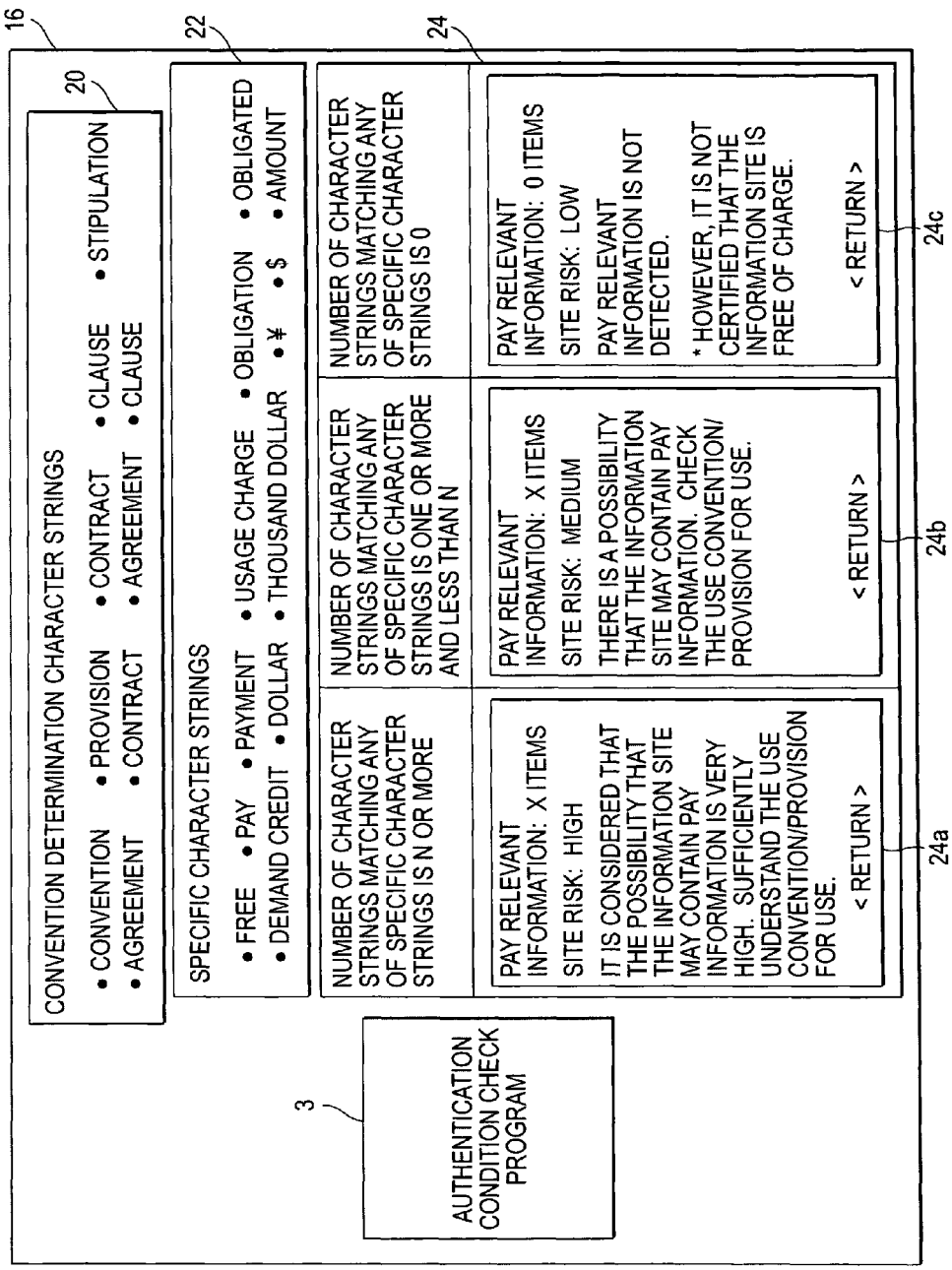
FIG. 3 is a conceptual drawing of a storage section 16 according to the first embodiment of the invention.

FIG. 3 is a drawing to show the details of the storage section 16 in FIG. 1. As shown in FIG. 3, the convention determination character string table 20 has convention determination character strings as a basis for determining whether or not a convention or text similar to a convention is described in an electronic document. As such convention determination character strings, the convention determination character string table 20 has character strings such as "convention," "provision," "contract," and "clause."

If a site on the communication network sets charge payment as the authentication condition for acquiring an electronic document, the specific character string table 22 has character strings that can be used in the convention or text similar to the convention. As such specific character strings, the specific character string table 22 has character strings such as "free," "pay," "payment," and "usage charge."

The screen data table 24 has the range of the number (count) of the character strings matching the specific character strings counted by the processing operation of the control section 18 as described later (upper stage of the screen data table 24 in FIG. 3,) and screen data 24a, 24b, and 24c (lower stage of the screen data table 24 in FIG. 3) in association with each other.

Each of the screen data 24a and 24b is the description of suggesting that the site to be connected is a charged site and that there is a possibility that charge payment may be a condition for acquiring the electronic document.

That is, each of the screen data 24a and 24b is the description of suggesting that there is a possibility that the user can acquire a different electronic document associated with the electronic document displayed on the display section 6 of the mobile telephone 2 only if the user meets the authentication condition stipulated at the site having the different electronic document. The screen data 24c is the description of suggesting that the possibility that the site is a charged site is low.

Like a former general mobile telephone, the mobile telephone 2 has the communication section 4 shown in FIG. 1 for connecting to a communication line through the nearest base station (not shown) and enables the user to hold a conversation through the voice processing section 10, the loudspeaker 12, and the microphone 14 as the user performs calling or call reception operation through the operation section 8.

When the user presses the Web key 8a shown in FIG. 2, the mobile telephone 2 displays the names of connectable sites as a menu (not shown) in the mid stage portion 6e of the display section 6. If the user specifies any of the sites, the mobile telephone 2 connects to the specified site, acquires the electronic document, and displays the electronic document in the mid stage portion 6e of the display section 6.

After displaying the electronic document on the display section 6, like a former general mobile telephone, the mobile telephone 2 can display other electronic documents one after another in a chained manner as the user uses the hyper link function to specify the description part associated with a different electronic document in the electronic document being displayed.

Figure 4:
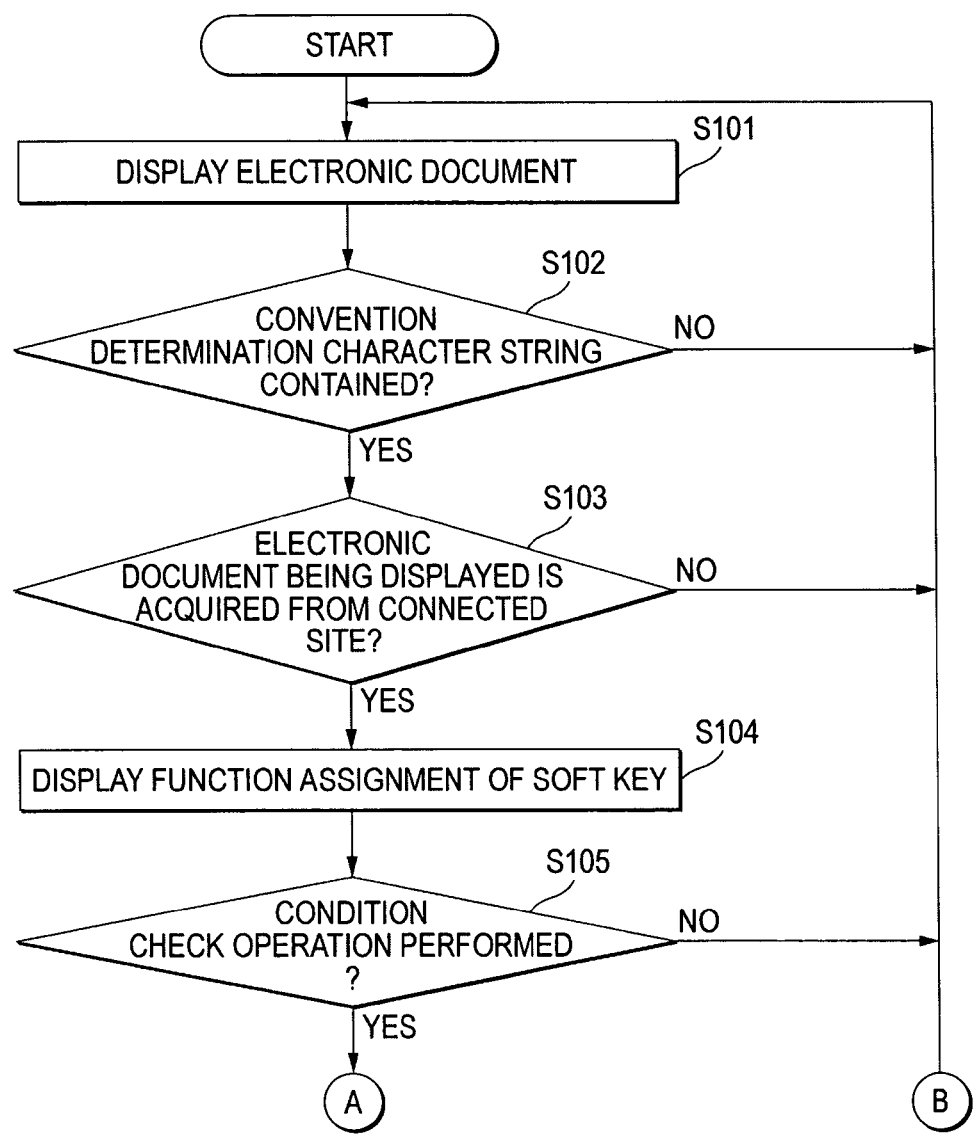
FIG. 4 is a flowchart to show an operation procedure of a control section 18 in the first embodiment of the invention.
Figure 5:
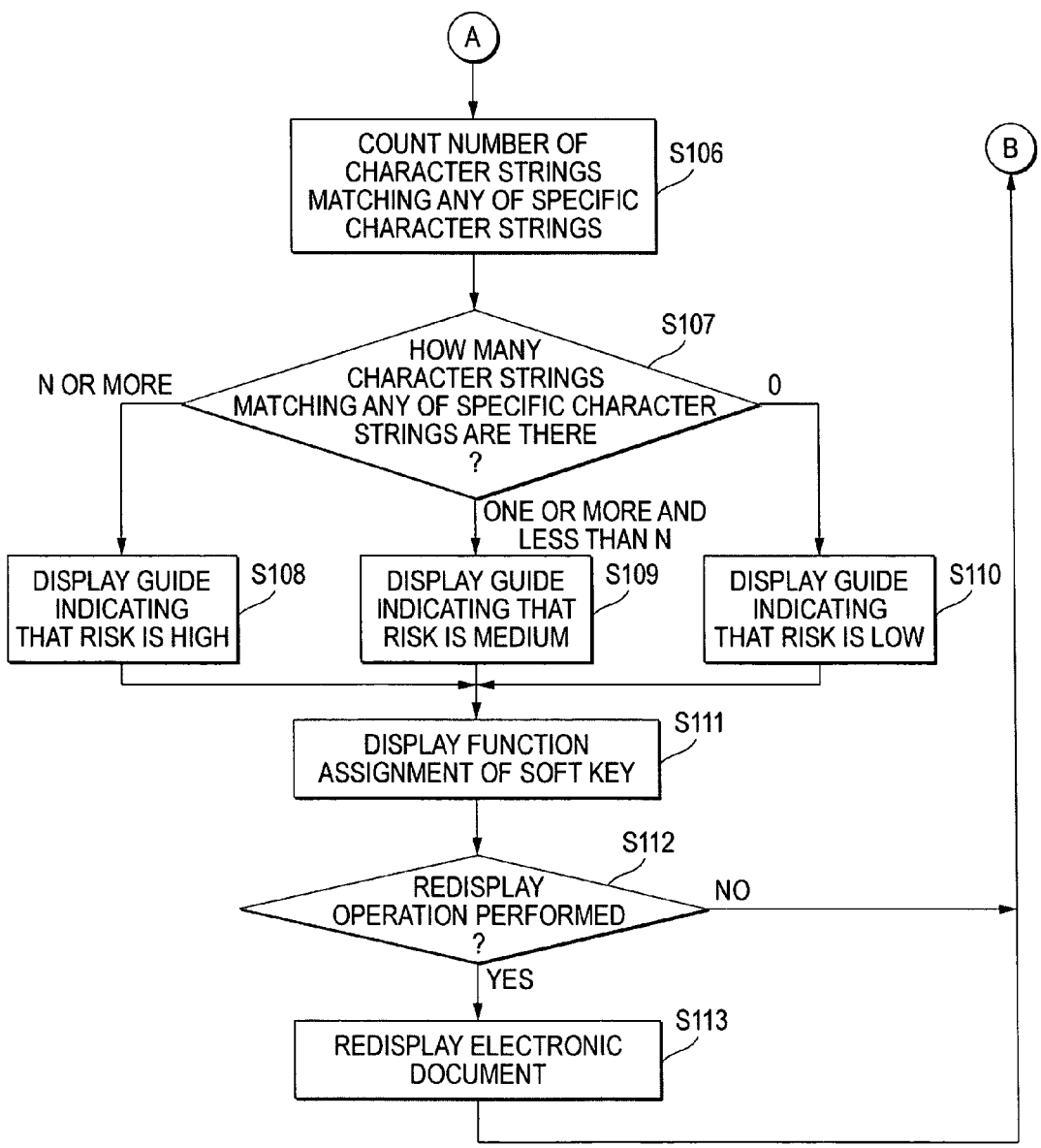
FIG. 5 is a flowchart to show the operation procedure of the control section 18 in the first embodiment of the invention.

Next, the processing operation of the control section 18 for determining whether or not there is a possibility that the site may be a charged site if the site can be connected as the user makes a contract when an electronic document for prompting the user to make a contract of user registration is displayed on the display section 6 of the mobile telephone 2 according to user operation will be discussed based on flowcharts of FIGS. 4 and 5. The processing operation of the control section 18 shown in the flowcharts of FIGS. 4 and 5 is performed based on the authentication condition check program 3 stored in the storage section 16 (see FIG. 3).

Figure 6:
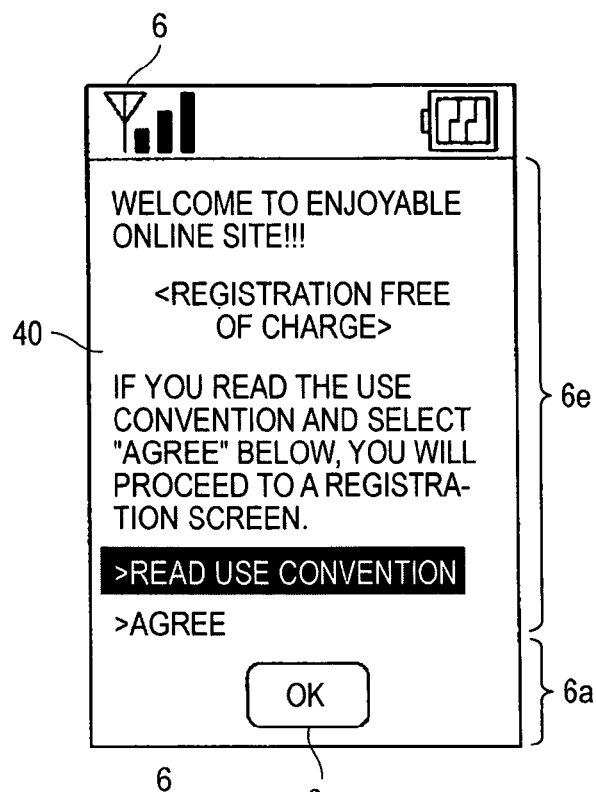
FIG. 6 is a fragmentary plan view to show a state in which an electronic document 40 is displayed on a display section 6 shown in FIG. 2.

For example, it is assumed that an electronic document 40 for prompting the user to conduct user registration as shown in FIG. 6 is displayed in the mid stage portion 6e of the display section 6 as the user operates the mobile telephone 2 using the hyper link function. The user cannot know whether the user registration is conducted for a charged site or a free site simply by seeing the electronic document 40 at a glance.

Figure 7:
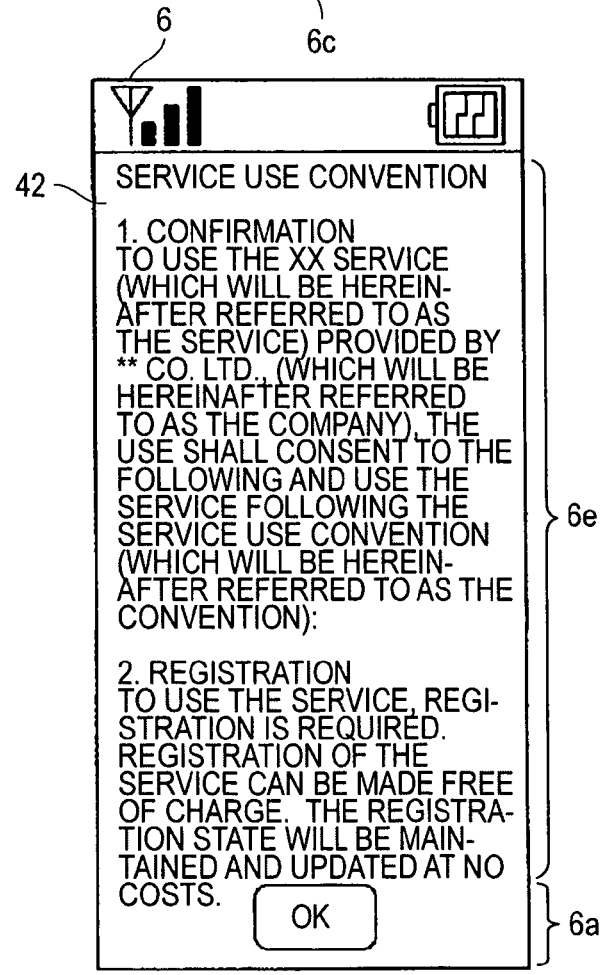
FIG. 7 is a fragmentary plan view to show a state in which a part of an electronic document 42 is displayed on a display section 6 shown in FIG. 2.

In such a case, the user specifies the description part of "read the use convention" to read the convention about the user registration, thereby operating the hyper like function for displaying an electronic document 42 of the convention as shown in FIG. 7 in the mid stage portion 6e of the display section 6.

In fact, since the electronic document 42 shown in FIG. 7 contains a large information amount as shown in FIG. 8, only a part of the electronic document 42 is displayed in the mid stage portion 6e of the display section 6. The user can see other portions of the electronic document 42 than the portion displayed in the mid stage portion 6e of the display section 6 by scrolling the screen.

The processing operation of the control section 18 based on the flowcharts of FIGS. 4 and 5 can determine whether or not there is a possibility that the site may be a charged site if the site can be connected as the user makes a contract when the electronic document 42 of the convention is displayed on the display section 6.

If a new electronic document is displayed on the display section 6 of the mobile telephone 2 is displayed (step S101 in FIG. 4), the control section 18 checks whether or not the electronic document contains a character string matching any of the convention determination character strings that the convention determination character string table 20 shown in FIG. 3 has (step S102 in FIG. 4). The checking process by the control section 18 is referred to as a searching operation.

If the electronic document displayed on the display section 6 does not contain a character string matching any of the convention determination character strings (NO at step S102), the control section 18 determines that the convention or text similar to the convention is not described in the electronic document, and skips the processing operation at step S103 and the later.

When the electronic document 42 as shown in FIG. 8 is displayed on the display section 6 and contains a character string matching any of the convention determination character strings (YES at step S102), the control section 18 goes to step S103 and determines whether or not the electronic document displayed on the display section 6 is acquired from a site on the communication network. Such a determination can be made based on information indicating the source location of the electronic document such as URL (Uniform Resource Locator), for example.

If the control section 18 determines that the electronic document displayed on the display section 6 is not acquired from a site on the communication network (NO at step S103), the control section 18 skips the processing operation at step S104 and the later.

The case where the electronic document is not acquired from a site on the communication network is the case where the electronic document is previously stored in the storage section 16 of the mobile telephone 2 or the case where the electronic document stored in external storage is read.

If the control section 18 determines that the electronic document displayed on the display section 6 is acquired from a site on the communication network (YES at step S103), the control section 18 displays the function guidance 6d indicating that the user can check the condition by operating the soft key 8d as shown in FIG. 2 (step S104 in FIG. 4).

If the user does not press the soft key 8d and performs another operation (NO at step S105), namely, if the user does not perform condition check operation, the processing operation at step S106 and the later is skipped for the current electronic document displayed on the display section 6. The function guidance 6d being displayed is restored to the undisplayed state.

If the user presses the soft key 8d (YES at step S105), namely, if the user performs condition check operation, the control section 18 counts how many character strings matching any of the specific character strings that the specific character string table 22 shown in FIG. 3 has are contained in the electronic document displayed on the display section 6 (step S106 in FIG. 5). That is, the control section 18 counts how many character strings matching any of the specific character strings are contained in the electronic document 42 as shown in FIG. 8.

The control section 18 selects any of the screen data 24a, 24b, or 24c shown in FIG. 3 based on the number of the character strings matching any of the specific character strings in the electronic document, and displays any of the screen data 24a, 24b, or 24c in the mid stage portion 6e of the display section 6 in place of the current electronic document being displayed (steps S107 to S110 in FIG. 5).

That is, if the electronic document contains N or more character strings matching any of the specific character strings ("N or more" at step S107), the screen data 24*a* shown in FIG. 3 is displayed in the mid stage portion 6*e* of the display section 6 (see FIG. 2).

If the electronic document contains one or more and less than N character strings matching any of the specific character strings ("one or more and less than N" at step S107 in FIG. 5), the screen data 24*b* shown in FIG. 3 is displayed in the mid stage portion 6*e* of the display section 6.

If the electronic document contains no character strings matching any of the specific character strings ("0" at step S107 in FIG. 5), the screen data 24*c* shown in FIG. 3 is displayed in the mid stage portion 6*e* of the display section 6.

After performing the processing operation at any of steps S108 to S110 in FIG. 5, the control section 18 displays the function guidance 6*b* (see FIG. 2) indicating that the electronic document displayed just before any of the screen data 24*a*, 24*b*, or 24*c* being displayed can be redisplayed as the user presses the soft key 8*b* in place of any of the screen data 24*a*, 24*b*, or 24*c* being displayed at present in the mid stage portion 6*e* of the display section 6 (step S111 in FIG. 5).

If the user presses the soft key 8*b* (YES at step S112), the control section 18 redisplays the electronic document on the display section 6 (step S113). Here, the control section 18 displays the character strings matching any of the specific character strings in the electronic document in a different format from that of other parts than the character strings matching any of the specific character strings.

For example, if the electronic document 42 shown in FIG. 8 is redisplayed on the display section 6, a box is drawn around only the character strings of "usage charge," "amount," "payment," etc, matching any of the specific character strings in the electronic document 42 for display, as shown in FIG. 8.

To redisplay the electronic document on the display section 6, the control section 18 restores the function guidance 6*d* to the un-displayed state.

If the user does not press the soft key 8*b* and performs another operation (NO at step S112), the control section 18 does not redisplay the electronic document.

According to the mobile telephone 2, the authentication condition check method of the mobile telephone, and the authentication condition check program 3 according to the first embodiment, the user can be prevented from connecting to the site without sufficiently recognizing the fact that the authentication condition stipulated by the site having the electronic document needs to be met in order to acquire the electronic document.

That is, the screen data 24*a*, 24*b* for suggesting that the site to be connected is a charged site and that there is a possibility that charge payment may be a condition for acquiring the electronic document is displayed. Therefore, the user can be prevented from misunderstanding that the charged site is a free site and conducting user registration in the charged site for connecting thereto.

If the electronic document displayed on the display section contains a character string matching any of the convention determination character strings, the function guidance 6*d* is displayed. Therefore, the user can be prompted to check the condition.

Second Embodiment

A mobile telephone 50 shown in FIG. 1, an authentication condition check method of the mobile telephone 50, and an authentication condition check program 51 shown in FIG. 1 according to a second embodiment of the invention will be discussed based on FIGS. 10 and 11. Parts similar to those of the mobile telephone 2 and the authentication condition check program 3 according to the first embodiment described above are denoted by the same reference numerals and similar components, similar processing operation will not be discussed again.

Figure 10:
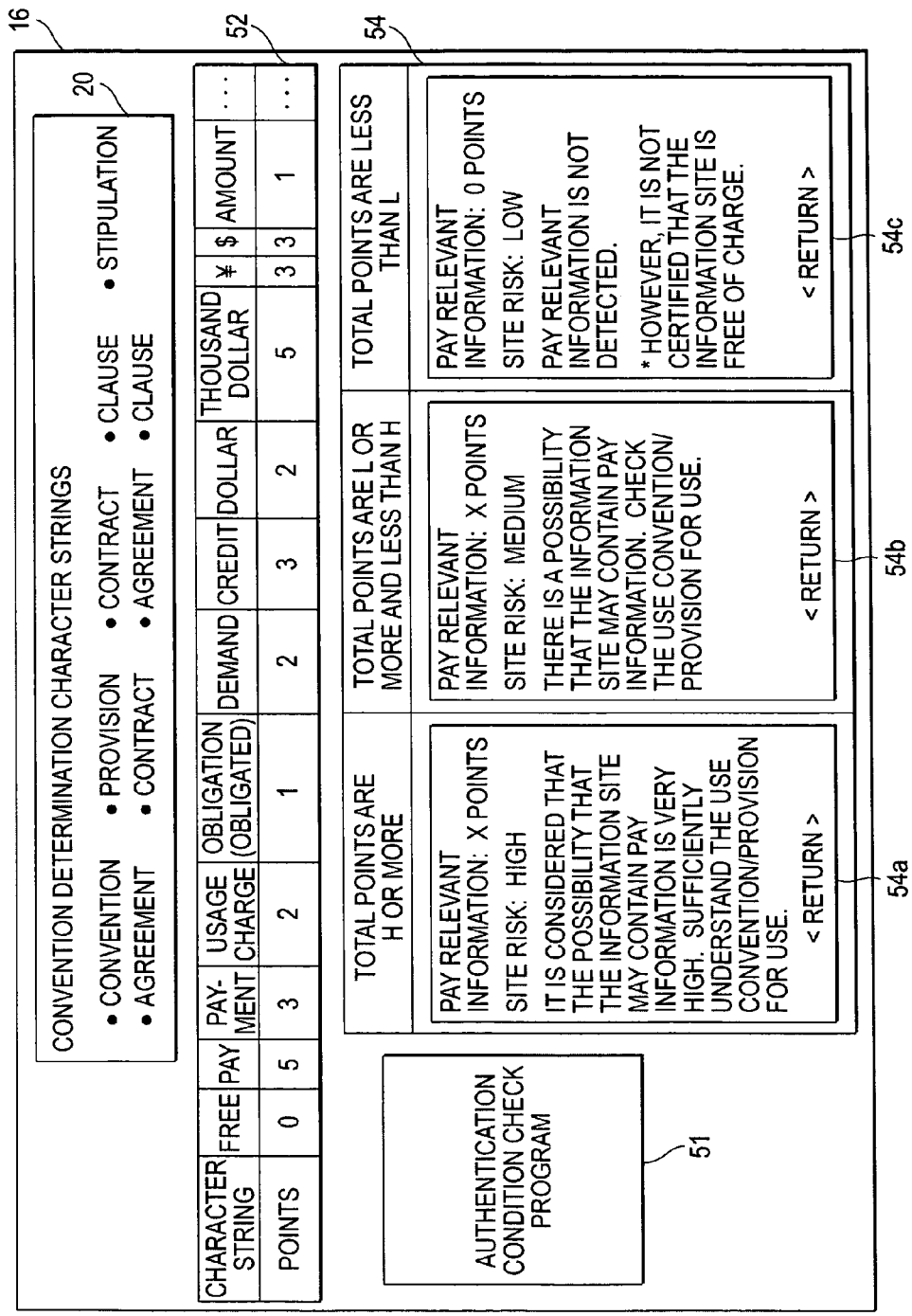
FIG. 10 is a conceptual drawing of a storage section 16 according to a second embodiment of the invention.

The mobile telephone 50 of the second embodiment has a storage section 16 having a specific character string table 52 and a screen data table 54 in place of the specific character string table 22 and the screen data table 24, as shown in FIG. 10.

The specific character string table 52 has specific character strings like the specific character string table 22 in the first embodiment and also has points (point information) corresponding to each of the specific character strings.

Like the screen data table 24 in the first embodiment, the screen data table 54 has screen data 54*a*, 54*b*, and 54*c*.

In the first embodiment described above, the screen data 24*a*, 24*b*, and 24*c* in the screen data table 24 are provided in a one-to-one correspondence with the ranges of the number of the character strings matching any of the specific character strings in the convention or text similar to the convention described in an electronic document. In the second embodiment, however, the screen data 54*a*, 54*b*, and 54*c* are provided in a one-to-one correspondence with the ranges of the total points (count) resulting from replacing each of the character strings matching any of the specific character strings with the corresponding points in the specific character string table 52 and accumulating the points (upper stage of the screen data table 54 in FIG. 10).

Figure 11:
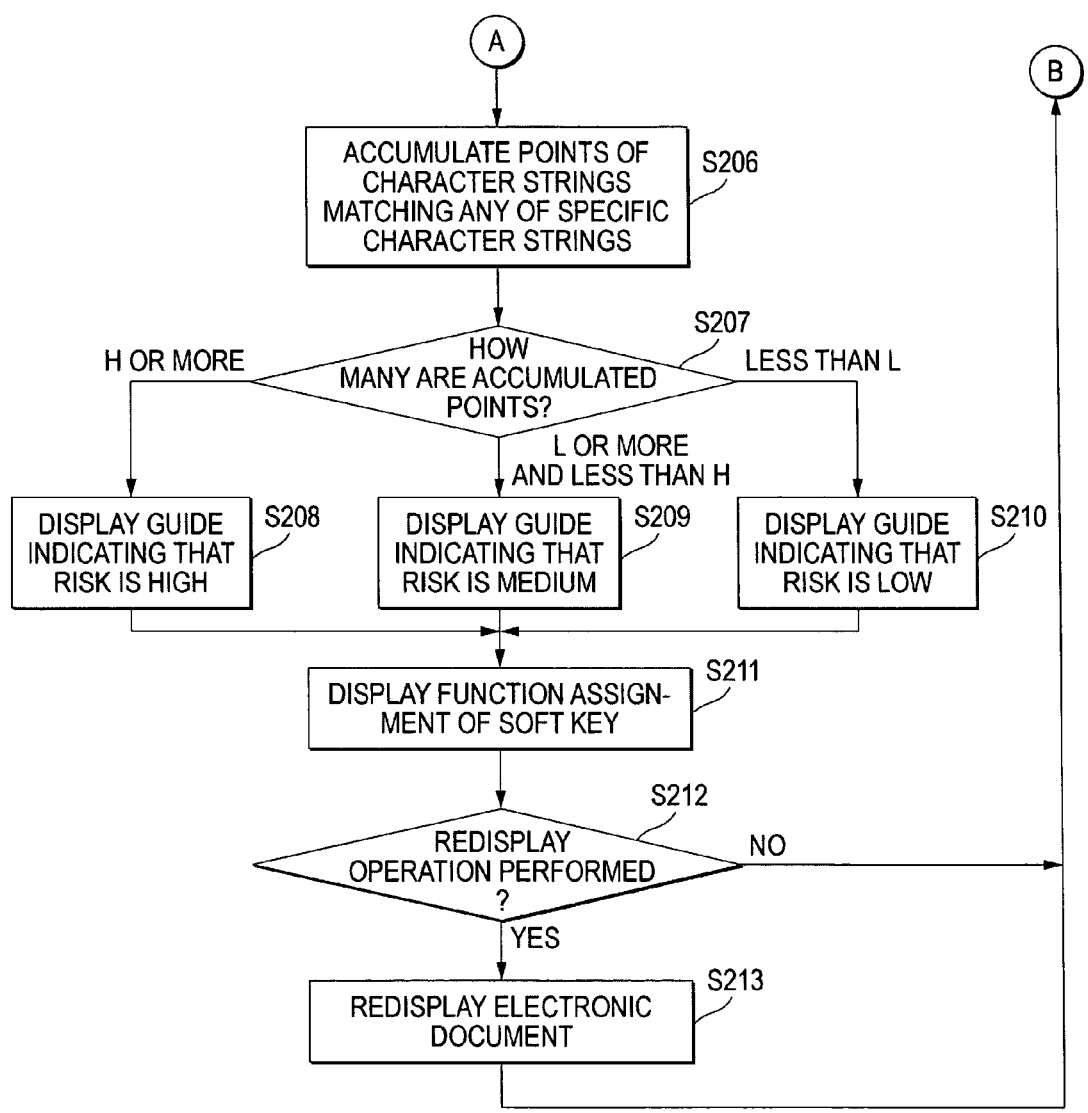
FIG. 11 is a flowchart to show an operation procedure of a control section 18 in the second embodiment of the invention.

A control section 18 of the mobile telephone 50 according to the second embodiment performs similar processing operation to the processing operation at steps S101 to S105 in FIG. 4 in the first embodiment described above, and then performs processing operation at steps S206 to S213 as shown in FIG. 11 based on the authentication condition check program 51.

That is, if the user performs condition check operation at step S105 in FIG. 4 (YES at step S105), the control section 18 replaces each character string matching any of the specific character strings in the specific character string table 52 shown in FIG. 10 with the points corresponding to the specific character string, and accumulates the points to find the total points (step S206 in FIG. 11).

The control section 18 selects any of the screen data 54*a*, 54*b*, or 54*c* shown in FIG. 10 based on the total points, and displays any of the screen data 54*a*, 54*b*, or 54*c* in a mid stage portion 6*e* of the display section 6 in place of the current electronic document being displayed (steps S207 to S210 in FIG. 11).

The control section 18 performs similar processing operation to that at steps S111 to S113 in FIG. 4 at steps S211 to S213 after performing processing operation at any of steps S208 to S210 in FIG. 11.

According to the mobile telephone 50, the authentication condition check method of the mobile telephone 50, and the authentication condition check program 51 of the second embodiment, the user can be prevented from connecting to the site carelessly without sufficiently recognizing the fact that the authentication condition stipulated by the site having the electronic document needs to be met in order to acquire the electronic document as with the first embodiment.

That is, the screen data 54*a*, 54*b* for suggesting that the site to be connected is a charged site and that there is a possibility that charge payment may be a condition for acquiring the electronic document is displayed. Therefore, the user can be prevented from misunderstanding that the charged site is a free site and conducting user registration in the charged site for connecting thereto.

As in the case of the first embodiment, if the electronic document displayed on the display section contains a character string matching any of the convention determination character strings, the function guidance 6d is displayed. Therefore, the user can be prompted to check the condition as with the first embodiment.

In the first and second embodiments, the specific character string table 22, 52 has the character strings relating to charge payment as the specific character strings to prevent the user from misunderstanding that the charged site is a free site and conducting user registration in the charged site for connecting thereto. However, the specific character string table 22, 52 may have other character strings than the character strings relating to charge payment, etc.

For example, if the specific character string table 22, 52 has character strings relating to the age, such as "20 years old" and "underage," as the specific character strings, the user can be prevented from connecting to a site where reaching a given age is stipulated as the authentication condition.

In the first and second embodiments, if the control section 18 determines at step S107 in the flowchart of FIG. 5 or at step S207 in the flowchart of FIG. 11 that the number of the character strings matching any of the specific character strings is N or more, the control section 18 performs the processing operation of displaying any of the screen data 24a, 24b, or 24c or any of the screen data 54a, 54b, or 54c on the display section 6 at any of steps S108 to S110 or at any of steps S208 to S210. However, the user may be inhibited from accessing any site associated with the electronic document, or another guide for requesting the user to pay attention may be displayed at the access requesting time in place of or together with the processing operation.

The mobile telephone 2, 50 according to the first and second embodiments may enable the user to change one or more of the characters making up each specific character string in the specific character string table 22, 52 through the operation section 8, and may have the storage section 16 to store the specific character string table 22, 52 so as to have the new character string subjected to the change.

In the first and second embodiments, when the user performs the condition check operation, the control section 18 performs the processing operation at step S106 and the later in the flowchart of FIG. 5 or the processing operation at step S206 and the later in the flowchart of FIG. 11. However, when the electronic document 40 for prompting the user to make user registration as shown in FIG. 6 is displayed, if the user specifies the description part directly associated with the convention or the electronic document similar to the convention like "READ USE CONVENTION," similar processing operation to the processing operation at step S102 in the flowchart of FIG. 5 may be performed, whereby it may be determined that the specified description part is directly associated with the convention or the electronic document similar to the convention, and the processing operation at step S106 and the later or the processing operation at step S206 and the later in the flowchart of FIG. 11 may be performed for the electronic document 40.

In the first and second embodiments, the electronic document of the use convention is acquired and then is once displayed on the display section 6 and then the user performs the condition check operation. However, the user may perform the condition check operation before the electronic document of the use convention is displayed as a different embodiment from the first and second embodiments.

That is, although not shown, if an electronic document of "contract provision" containing the description of acquiring an electronic document of the use convention and the description of skipping the use convention and making a request for acquiring any other information as options of the hyper link function for performing the processing operation of the descriptions is displayed on the display section 6, when the user performs the condition check operation with a cursor set to the option of the description of acquiring an electronic document of the use convention, as the processing operation of the control section 18 is performed, if the user does not perform option determination operation, the electronic document of the use convention may be acquired and may be expanded on the storage section 16 and then check work as to whether or not a specific character string is contained may be performed as at step S106 in FIG. 5 or step S206 in FIG. 11.

In such a case, the check work may be performed in the background without displaying the electronic document of the use convention on the display section 6. If a specific character string is contained, processing operation similar to that at steps S107 to S110 in FIG. 5 or at steps S207 to S210 in FIG. 11 is performed, whereby either of the screen data 24a and 24b or either of the screen data 54a and 54b is displayed on the display section 6 for making the user recognize the necessity for reading the use convention thoroughly as with the first or second embodiment.

If the user sees either of the screen data 24a and 24b or either of the screen data 54a and 54b and performs operation of determining the option of the description of acquiring the electronic document of the use convention in the electronic document of "contract provision," the electronic document of the use convention already acquired and stored in the storage section 16 may be displayed on the display section 6. Each character string matching any of the specific character strings in the electronic document of the use convention may be distinguished from other character strings in a different display format in such a manner that a box is drawn around the character string matching any of the specific character strings for display.

In doing so, it is made possible for the user to more easily check the conditions of the electronic document estimated to be long text, such as the use convention.

In the description of the first and second embodiments and the different embodiment from the first and second embodiments, after completion of display of the guide screen data 24a, 24b, 24c, 54a, 54b, 54c, the electronic document of the use convention is displayed and each character string matching any of the specific character strings is distinguished from other character strings in such a manner that a box is drawn around the character string matching any of the specific character strings for display. However, the invention is not limited to the mode. For example, the screen data 24a, 24b, 24c, 54a, 54b, 54c is displayed in a part of the mid stage portion 6e of the display section 6 (see FIG. 2) and the electronic document of the use convention with a box drawn around each character string matching any of the specific character strings is superposed on the lower side of the screen data 24a, 24b, 24c, 54a, 54b, 54c or they are displayed side by side, whereby the user may be enabled to see both the screen data 24a, 24b, 24c, 54a, 54b, 54c and the electronic document of the use convention at the same time. In doing so, the user can easily determine which representation to which the user should pay particular attention at a glance.

In the first and second embodiments, the authentication condition check program 3, 51 cooperates with the program of the browser and is a separate program from the browser, but may contain the program of the browser.

In the description of the first and second embodiments, the invention is applied to the mobile telephone 2, 50, but can also be applied to other mobile terminals than the mobile telephone 2, 50, such as a PDA (Personal Digital Assistant), needless to say.

In the first and second embodiments, the authentication condition check program 3, 51, the convention determination character string table 20, the specific character string table 22, 52, and the screen data table 24, 54 are stored in the storage section 16 of the mobile telephone 2, 50, and the control section 18 performs the processing operation based on the authentication condition check program 3, 51. However, the authentication condition check program 3, 51, the convention determination character string table 20, the specific character string table 22, 52, and the screen data table 24, 54 may be stored in a storage section of a general purpose computer such as a personal computer and the general purpose computer may be caused to perform similar processing operation to that previously described with reference to the flowcharts of FIGS. 4 and 5 or FIG. 11.

That is, in the description of the first and second embodiments, the mobile telephone 2, 50 is taken as an example, but the invention is not limited to the mobile telephone 2, 50 and may be applied to a server that can be connected to a network constructed on communication lines for supplying an electronic document and an information terminal that can be connected to a site administrated using a server. The invention can also be embodied in a personal computer, a PHS (Personal Handyphone System), a PDA and a car navigation system having a communication function, and the like.

What is claimed is:

1. An information terminal, comprising:
   a communication section which communicates with any site to download an electronic document including text;
   a display section which displays the electronic document;
   an operation section which operates the displayed electronic document;
   a storage section which stores the electronic document a specific character string, and a guide image including a guide text; and
   a control section which counts a number of specific character strings in an authentication term that states a condition for downloading a different electronic document of the site and determines that a condition check operation is performed through the operation section, wherein
   the control section controls the display section to display the guide image and determines that the number of specific character strings is equal to or greater than a predetermined number;
   the guide text indicates a risk level of the authentication term;
   the specific character string is a word corresponding to payment or contract; and
   the displayed guide image is hidden when the displayed guide image is operated.

2. The information terminal according to claim 1, wherein the storage section stores a plurality of specific character strings.

3. The information terminal according to claim 2, wherein point information corresponds to each of the specific character strings, and
   the control section counts the number of the specific character strings based on the point information.

4. The information terminal according to claim 1, wherein at least one character constituting the specific character string enables to be changed through an operation with using the operation section, and
   the storage section stores a changed specific character string.

5. The information terminal according to claim 1, wherein the control section counts the number of specific character strings only if the displayed electronic document is downloaded through the communication section.

6. The information terminal according to claim 1, wherein the storage section stores a plurality of guides for each level of the count, and
   the control section controls the display section to display one of the plurality of guides according to a level of the acquired count.

7. The information terminal according to claim 1, wherein when the control section controls the display section to display the guide, the control section controls the display section to display the electronic document together and display a character string matching the specific character string in the electronic document in a different format from that of other character strings.

8. The information terminal according to claim 1, wherein if an operation for displaying the electronic document on the display section is performed through the operation section after the control section controls the display section to display the guide, the control section controls the display section to display a character string matching the specific character string in the electronic document in a different format from that of other character strings.

9. The information terminal according to claim 1, wherein the guide indicates a possibility that the site having the different electronic document may stipulate an authentication condition, which must be met before acquisition of the different electronic document associated with the electronic document displaying on the display section is permitted.

10. The information terminal according to claim 1, wherein the guide indicates a risk of payment as the possibility.

11. The information terminal according to claim 1, wherein the specific character string does not include an identifying element.

12. An authentication condition check method of an information terminal, comprising:
    a communication section which communicates with any site to download an electronic document including text;
    a display section which displays the electronic document;
    an operation section which operates the displayed electronic document; and
    a storage section,
    the authentication condition check method comprises the steps of:
    storing the electronic document, a guide image including a guide text, and a specific character string in the storage section, wherein
      the guide text indicates a risk level of an authentication term, and
      the specific character string is a word corresponding to payment or contact;
    counting a number of specific character strings matching the specific character string in the authentication term that states a condition for downloading a different electronic document of the site and determining that a condition check operation is performed through the operation section; and
    controlling the display section to display the guide image and determining that the number of specific character strings is equal to or greater than a predetermined number, wherein the displayed guide image is hidden when the displayed guide image is operated.

13. The authentication condition check method according to claim 12, wherein the guide indicates a possibility that the site having the different electronic document may stipulate an authentication condition, which must be met before acquisition of the different electronic document associated with the electronic document displaying on the display section is permitted.

14. A non-transitory computer readable storage medium encoded with an authentication condition check program and executed by a processor for causing an information terminal to function as:
   a communication section which communicates with any site to download an electronic document including text;
   a display section which displays the electronic document;
   an operation section which operates the displayed electronic document;
   a storage section which stores the electronic document, a guide image including a guide text, and a specific character string, wherein
      the guide text indicates a risk level of an authentication term, and
      the specific character string is a word corresponding to payment or contact; and
   a control section which counts a number of specific character strings in the authentication term that states a condition for downloading a different electronic document of the site and determines that a condition check operation is performed through the operation section, wherein the control section controls the display section to display the guide image and determines that the number of specific characters strings is equal to or greater than a predetermined number, wherein the displayed guide image is hidden when the displayed guide image is operated.

15. The non-transitory computer readable storage medium according to claim 14, wherein the storage section stores a plurality of specific character strings.

16. The non-transitory computer readable storage medium according to claim 15, wherein
   point information corresponds to each of the specific character strings, and
   the control section counts the number of the specific character strings based on the point information.

17. The non-transitory computer readable storage medium according to claim 14, wherein
   at least one character constituting the specific character string enables to be changed through an operation with using the operation section, and
   the storage section stores a changed specific character string.

18. The non-transitory computer readable storage medium according to claim 14, wherein the control section counts the number of specific character strings only if the displayed electronic document is downloaded through the communication section.

19. The non-transitory computer readable storage medium according to claim 14, wherein
   the storage section stores a plurality of guides for each level of the count, and
   the control section controls the display section to display one of the plurality of guides according to a level of the acquired count.

20. The non-transitory computer readable storage medium according to claim 14, wherein when the control section controls the display section to display the guide, the control section controls the display section to display the electronic document together and display a character string matching the specific character string in the electronic document in a different format from that of other character strings.

21. The non-transitory computer readable storage medium according to claim 14, wherein if an operation for displaying the electronic document on the display section is performed through the operation section after the control section controls the display section to display the guide, the control section controls the display section to display a character string matching the specific character string in the electronic document in a different format from that of other character strings.

22. The non-transitory computer readable storage medium according to claim 14, wherein the guide indicates a possibility that the site having the different electronic document may stipulate an authentication condition, which must be met before acquisition of the different electronic document associated with the electronic document displaying on the display section is permitted.

23. An information terminal, comprising:
   a communication section which communicates with any site to download an electronic document including text;
   a display section which displays the electronic document;
   an operation section which operates the displayed electronic document;
   a storage section which stores the electronic document, a guide image including a guide text, and a specific character string; and
   a control section which counts a number of specific character strings in an authentication term that states a condition for downloading a different electronic document of the site and determines that a condition check operation is performed through the operation section, wherein
   the control section controls the display section to display the guide image and determines that the number of specific character strings is equal to or greater than a predetermined number,
   the guide text indicates a risk level of the authentication term;
   the specific character string is a word corresponding to payments or contacts; and
   the displayed guide image is hidden when the displayed guide image is operated.

* * * * *